US008499883B2

(12) United States Patent
Terada

(10) Patent No.: US 8,499,883 B2
(45) Date of Patent: Aug. 6, 2013

(54) BRACKET FASTENING STRUCTURE

(75) Inventor: Tatsuhiro Terada, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 149 days.

(21) Appl. No.: 12/809,330

(22) PCT Filed: Dec. 19, 2008

(86) PCT No.: PCT/IB2008/003722

§ 371 (c)(1),
(2), (4) Date: Jun. 30, 2010

(87) PCT Pub. No.: WO2009/087477

PCT Pub. Date: Jul. 16, 2009

(65) Prior Publication Data

US 2010/0269780 A1 Oct. 28, 2010

(30) Foreign Application Priority Data

Dec. 21, 2007 (JP) ................................ 2007-330566

(51) Int. Cl.
*B62D 21/00* (2006.01)
*B60K 5/00* (2006.01)
*F02F 7/00* (2006.01)
*F16M 1/00* (2006.01)

(52) U.S. Cl.
USPC ........ 180/312; 123/195 A; 180/291; 180/299; 248/584; 248/674

(58) Field of Classification Search
USPC .................. 123/195 R, 195 A; 180/291, 299, 180/312; 248/584, 674
See application file for complete search history.

(56) References Cited

U.S. PATENT DOCUMENTS 2,875,746 A * 3/1959 Brice et al. ................ 123/195 A
3,362,243 A * 1/1968 Ferguson ...................... 474/113
3,730,147 A * 5/1973 Buchwald .................. 123/41.44
4,899,703 A * 2/1990 Buferne .................... 123/195 A
5,062,496 A * 11/1991 Fukada et al. ................ 180/291
5,065,713 A * 11/1991 Seats ......................... 123/195 A
5,090,502 A 2/1992 Inoue et al.
5,219,138 A * 6/1993 Shier et al. ............... 248/222.14
5,222,467 A * 6/1993 Sasada ...................... 123/195 H
5,305,847 A * 4/1994 Mefford ........................ 180/292
6,101,995 A * 8/2000 Itoh et al. .................. 123/195 A
6,223,850 B1 5/2001 Rajca et al.
6,324,744 B1 12/2001 Banks et al.
6,609,491 B2 * 8/2003 Itoh et al. .................. 123/195 A
6,758,301 B2 * 7/2004 Shiba et al. ................... 180/383
6,959,780 B2 * 11/2005 Oshima et al. ................ 180/299
2003/0062211 A1 4/2003 Tsuruda

FOREIGN PATENT DOCUMENTS

JP 03-092530 U 9/1991
JP 04-292529 A 10/1992

(Continued)

OTHER PUBLICATIONS

Japanese Office Action for corresponding JP Patent Application No. 2007-330566 issued on Nov. 17, 2009.

*Primary Examiner* — Toan To
*Assistant Examiner* — Laura Freedman
(74) *Attorney, Agent, or Firm* — Sughrue Mion, PLLC

(57) ABSTRACT

A first fastening portion (100) for fastening a cylinder block (20) and a bracket (50) to each other and a second fastening portion (200) for fastening a crank case (30) and the bracket (50) to each other are so provided as to have interposed therebetween a fastening bolt (40) for fastening the cylinder block (20) and the crank case (30) to each other.

11 Claims, 5 Drawing Sheets

FOREIGN PATENT DOCUMENTS

| | | | | |
|---|---|---|---|---|
| JP | 05-033847 | A | | 2/1993 |
| JP | 06-193460 | A | | 7/1994 |
| JP | 10-220683 | A | | 8/1998 |
| JP | 2003-049706 | A | | 2/2003 |
| JP | 2005-220783 | A | | 8/2005 |
| JP | 2007113411 | A | * | 5/2007 |

* cited by examiner

BRACKET FASTENING STRUCTURE

FIELD OF THE INVENTION

The invention relates to a fastening structure for brackets fixed to an engine block of an internal combustion engine.

BACKGROUND OF THE INVENTION

In general, an engine block of an internal combustion engine is composed of a plurality of split bodies such as a cylinder head, a cylinder block, and a crank case. Further, this engine block has securely fastened thereto, by means of bolts, various brackets such as engine mount brackets for fixing the internal combustion engine itself to a vehicle, brackets for fixing auxiliaries (a compressor for an air-conditioner, an alternator, and the like) for the internal combustion engine to the engine block, and the like.

For example, Japanese Patent Application Publication No. 2003-49706 (JP-A-2003-49706) discloses a structure in which an engine mount bracket is securely fastened to lateral walls of an upper block having cylinders formed therein and a lower block supporting a crankshaft, across the respective blocks.

In the engine block, which is composed of a plurality of split bodies as disclosed in Japanese Patent Application Publication No. 2003-49706 (JP-A-2003-49706), the following inconveniences are presumable in the case of a structure in which each bracket is securely fastened across both adjacent ones of the split bodies, namely, a first split body and a second split body.

For example, aluminum alloys are often used for engine blocks in recent years for the sake of weight saving. On the other hand, iron (cast iron or the like) is often used for brackets from the standpoints of cost, strength, and the like. In the case where the material for the engine block and the material for the brackets are different from each other as in this case, there is a difference in thermal expansion coefficient (linear expansion coefficient) between the respective materials. More specifically, the linear expansion coefficient of the brackets is smaller than the linear expansion coefficient of the cylinder head, the cylinder block, and the crank case, which constitute the engine block. Thus, the thermal contraction amount of the brackets is smaller than the thermal contraction amount of the respective component members of the engine block. For example, as shown in FIG. 5, under a low-temperature environment, a force resulting from the aforementioned difference in thermal contraction amount to hinder the contraction of a cylinder block 300 and a crank case 400 is directly applied from a bracket 500 to a first fastening portion 310 of the cylinder block 300 to which the bracket 500 is fastened and a second fastening portion 410 of the crank case 400 to which the bracket 500 is fastened. When the contraction of the cylinder block 300 around the first fastening portion 310 and the contraction of the crank case 400 around the second fastening portion 410 are hindered as described above, a difference in contraction amount is created with respect to other regions. Thus, under the low-temperature environment, mating faces C of the cylinder block 300 and the crank case 400, which are located between the first fastening portion 310 and the second fastening portion 410, open.

The opening of the mating faces as described above is a phenomenon that occurs when there is a difference in thermal expansion amount or thermal contraction amount between the split bodies constituting the engine block and the brackets. Accordingly, the opening of the mating faces may also be caused when the linear expansion coefficient of the brackets is larger than the linear expansion coefficient of the split bodies constituting the engine block, namely, when the thermal expansion amount of the brackets is larger than the thermal expansion amount of the split bodies. In this case, the respective split bodies are pulled by the brackets at high temperatures, and the mating faces of the split bodies open as a result. Further, even in the case where the linear expansion coefficient of the split bodies constituting the engine block and the linear expansion coefficient of the brackets are equal to each other, a difference in thermal expansion amount or thermal contraction amount is created between the split bodies and the brackets when there is a difference in temperature between the split bodies and the brackets. Therefore, the mating faces of the split bodies may open in a similar fashion.

SUMMARY OF THE INVENTION

It is an object of the invention to provide a bracket fastening structure capable of suitably suppressing the opening of mating faces of a plurality of split bodies constituting an engine block which may be caused in the case where a bracket is securely fastened across both adjacent ones of the split bodies, namely, a first split body and a second split body.

An aspect of the invention relates to a bracket fastening structure. In this bracket fastening structure, a bracket is securely fastened across both adjacent ones of a plurality of split bodies constituting an engine block, namely, a first split body and a second split body. In this bracket fastening structure, a first fastening portion for fastening the first split body and the bracket to each other and a second fastening portion for fastening the second split body and the bracket to each other are so provided as to have interposed therebetween a bolt for fastening the first split body and the second split body to each other.

In the case where the thermal contraction amount of the bracket is smaller than the thermal contraction amount of the first split body and the second split body, or in the case where the thermal expansion amount of the bracket is larger than the thermal expansion amount of the first split body and the second split body, mating faces of the first split body and the second split body, which are located between the first fastening portion and the second fastening portion, may open. In this respect, according to the bracket fastening structure in the aspect of the invention, the first fastening portion and the second fastening portion are so provided as to have interposed therebetween the bolt for fastening the first split body and the second split body to each other. Therefore, the opening of the aforementioned mating faces is suppressed by the bolt. Accordingly, the opening of the mating faces of the plurality of the split bodies constituting the engine block, which may be caused in the case where the bracket is securely fastened across both the adjacent ones of the split bodies, namely, the first split body and the second split body, can be suitably suppressed.

In the bracket fastening structure, the bracket may be provided at end portions of the first split body and the second split body.

In the case where the bracket is provided at the end portions of the first split body and the second split body as in the example shown in the above-mentioned drawing of FIG. 5, the opening amount of the mating faces tend to be larger than in the case where the bracket is provided substantially at central portions of the first split body and the second split body. This tendency is attributable to the fact that when the bracket is provided at the end portions, the bolt for fastening the first split body and the second split body to each other exists in the direction of the central portions of the split bodies as viewed from the fastening portions but no such bolt exists in the direction of the end portions of the split bodies as viewed from the fastening portions, and the fastening rigidity of the split bodies in the direction of the end portions of the split bodies as viewed from the fastening portions is low. In this respect, according to the bracket fastening structure in the aspect of the invention, the opening of the mating faces of the first split body and the second split body can be suitably suppressed even when the bracket is fixed in the vicinity of the end portions.

The bracket may be provided at central portions of the first split body and the second split body.

The first split body may be a cylinder block, and the second split body may be a crank case. Further, the first split body may be a cylinder block, and the second split body may be a cylinder head.

Further, the aforementioned bracket may be an engine mount bracket for fixing the engine block to a vehicle, or a bracket for auxiliaries that is fixed to the engine block.

The engine block and the bracket may be made of materials that are different in thermal expansion amount or thermal contraction amount from each other.

The engine block and the bracket may be used under temperature environments that are different from each other.

The engine block and the bracket may be made of materials that are different in linear expansion coefficient from each other.

BRIEF DESCRIPTION OF THE DRAWINGS

The foregoing and further features and advantages of the invention will become apparent from the following description of an example embodiment with reference to the accompanying drawings, wherein like numerals are used to represent like elements and wherein.

DETAILED DESCRIPTION OF EMBODIMENT

Figure 1:
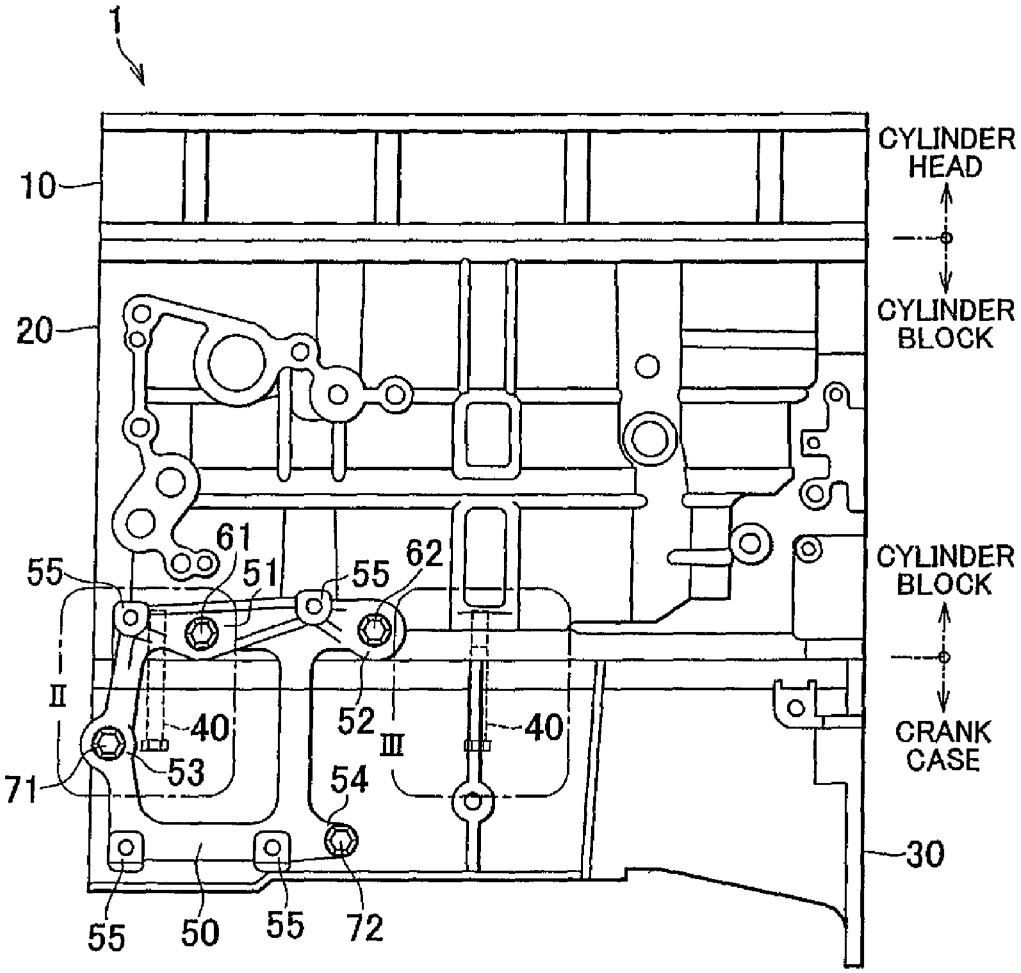
FIG. 1 is a lateral view of an engine block to which a bracket fastening structure according to the embodiment of the invention is applied.

An embodiment of an engine block to which a bracket fastening structure according to the invention is applied will be described hereinafter with reference to FIGS. 1 and 2. As shown in this drawing of FIG. 1, an engine block 1 of an internal combustion engine in this embodiment of the invention is composed of a cylinder head 10 in which a valve operating mechanism is disposed, a cylinder block 20 formed with cylinders in which pistons move in a reciprocating manner, and a crank case 30 supporting a crankshaft. The engine block 1 is generally composed of three split bodies. Further, the engine block 1 is formed of an aluminum alloy.

The cylinder block 20 and the cylinder head 10, which is disposed on an upper portion of the cylinder block 20, are securely fastened to each other by bolts. Further, the cylinder block 20 and the crank case 30, which is disposed on a lower portion of the cylinder block 20, are also securely fastened to each other by a plurality of fastening bolts 40 (only some of the fastening bolts 40 are shown in FIG. 1).

In this engine block 1, a bracket 50 is securely fastened across both the cylinder block 20 and the crank case 30, which are adjacent to each other. Further, this bracket 50 is fixed in the vicinity of end portions of the cylinder block 20 and the crank case 30. The bracket 50 is made of iron (e.g., cast iron).

This bracket 50 is a member for fixing an auxiliary (e.g., a compressor for an air-conditioner, an alternator, or the like) for the internal combustion engine to the engine block 1, and is provided with a plurality of fixing portions 55 for mounting the auxiliary.

This bracket 50 and the cylinder block 20 are securely fastened to each other by a first cylinder-side bolt 61 and a second cylinder-side bolt 62. Further, the bracket 50 and the crank case 30 are securely fastened to each other by a first crank-side bolt 71 and a second crank-side bolt 72.

More specifically, a first cylinder boss portion 51 having formed therethrough an insertion hole in which the first cylinder-side bolt 61 is inserted, and a second cylinder boss portion 52 having formed therethrough an insertion hole in which the second cylinder-side bolt 62 is inserted are formed on the bracket 50. Further, a first crank boss portion 53 having formed therethrough an insertion hole in which the first crank-side bolt 71 is inserted, and a second crank boss portion 54 having formed therethrough an insertion hole in which the second crank-side bolt 72 is inserted are also formed on the bracket 50.

A first cylinder-side female thread portion in which the first cylinder-side bolt 61 is screwed, and a second cylinder-side female thread portion which is provided closer to a center side of the cylinder block 20 than the first cylinder-side female thread portion and in which the second cylinder-side bolt 62 is screwed are formed in the cylinder block 20. Further, a first crank-side female thread portion in which the first crank-side bolt 71 is screwed, and a second crank-side female thread portion which is provided closer to a center side of the crank case 30 than the first crank-side female thread portion and in which the second crank-side bolt 72 is screwed are formed in the crank case 30.

The first cylinder-side bolt 61 inserted in the insertion hole of the first cylinder boss portion 51 is fastened to the first cylinder-side female thread portion, and the second cylinder-side bolt 62 inserted in the insertion hole of the second cylinder boss portion 52 is fastened to the second cylinder-side female thread portion. The bracket 50 and the cylinder block 20 are thereby securely fastened to each other.

Further, the first crank-side bolt 71 inserted in the insertion hole of the first crank boss portion 53 is fastened to the first crank-side female thread portion, and the second crank-side bolt 72 inserted in the insertion hole of the second crank boss portion 54 is fastened to the second crank-side female thread portion. The bracket 50 and the crank case 30 are thereby securely fastened to each other.

As described above, in this embodiment of the invention, as fastening portions for fastening the cylinder block 20 to brackets, a first fastening portion 100 is constituted by the first cylinder-side female thread portion and the first cylinder boss portion 51, and a third fastening portion is constituted by the second cylinder-side female thread portion and the second cylinder boss portion 52. Further, as fastening portions for fastening the crank case 30 to brackets, a second fastening portion 200 is constituted by the first crank-side female thread portion and the first crank boss portion 53, and a fourth fastening portion is constituted by the second crank-side female thread portion and the second crank boss portion 54.

Figure 2:
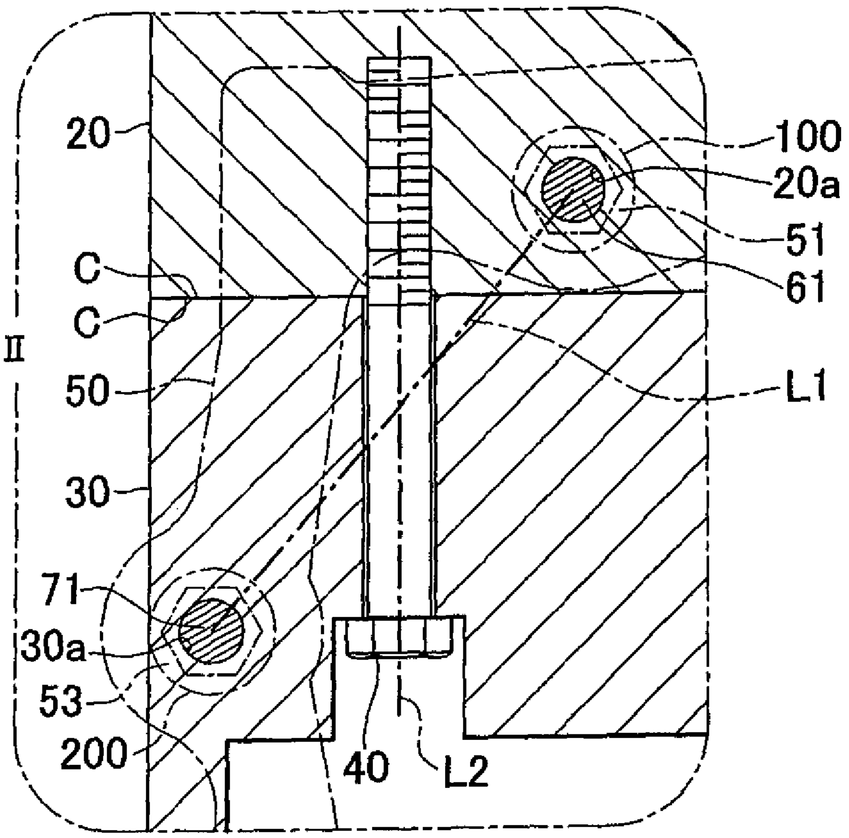
FIG. 2 is an enlarged cross-sectional view of a region II of FIG. 1.

FIG. 2 is an enlarged cross-sectional view of a region II of FIG. 1, namely, a region in the vicinity of the first fastening portion 100 and the second fastening portion 200. As shown in this drawing of FIG. 2, the first cylinder-side bolt 61 inserted in the first cylinder boss portion 51 is screwed in a first cylinder-side female thread portion 20*a*. Further, the first crank-side bolt 71 inserted in the first crank boss portion 53 is screwed in a first crank-side female thread portion 30*a*.

In this embodiment of the invention, the first fastening portion 100 and the second fastening portion 200, which have been described above, are so provided as to have interposed therebetween a fastening bolt 40 for fastening the cylinder block 20 and the crank case 30 to each other. That is, the first fastening portion 100 and the second fastening portion 200, which are provided adjacent to the single fastening bolt 40 in the vicinity thereof respectively, are provided such that a line L1 passing a center of the first fastening portion 100 (a center of the first cylinder-side female thread portion 20*a*) and a center of the second fastening portion 200 (a center of the first crank-side female thread portion 30*a*) intersects with a centerline L2 of the fastening bolt 40.

The operation and effect obtained by arranging the first fastening portion 100 and the second fastening portion 200 as described above will be described below. In this embodiment of the invention, the iron bracket 50 is securely fastened across both the cylinder block 20 and the crank case 30, which are adjacent to each other, in the engine block 1 made of the aluminum alloy, which is composed of the three split bodies. In this bracket fastening structure, as shown in the above-mentioned drawing of FIG. 5, if the first fastening portion 100 and the second fastening portion 200 are arranged with the fastening bolt 40 not interposed therebetween, the mating faces C of the cylinder block 20 and the crank case 30, which are located between the first fastening portion 100 and the second fastening portion 200, may open because the thermal contraction amount of the bracket 50 is smaller than the thermal contraction amount of the cylinder block 20 and the crank case 30.

In this embodiment of the invention, however, the first fastening portion 100 and the second fastening portion 200 are so provided as to have interposed therebetween the fastening bolt 40 for fastening the cylinder block 20 and the crank case 30 to each other. In the cylinder block 20 and the crank case 30, regions where this fastening bolt 40 is disposed are securely fixed. Accordingly, the opening of the mating faces C is suppressed by the fastening bolt 40.

Especially in this embodiment of the invention, the bracket 50 is provided in the vicinity of the end portions of the cylinder block 20 and the crank case 30. In the case where the bracket 50 is fixed at this position, the mode of arrangement of the first fastening portion 100 and the second fastening portion 200, which have been described above in this embodiment of the invention, brings about a particularly favorable effect.

Figure 5:
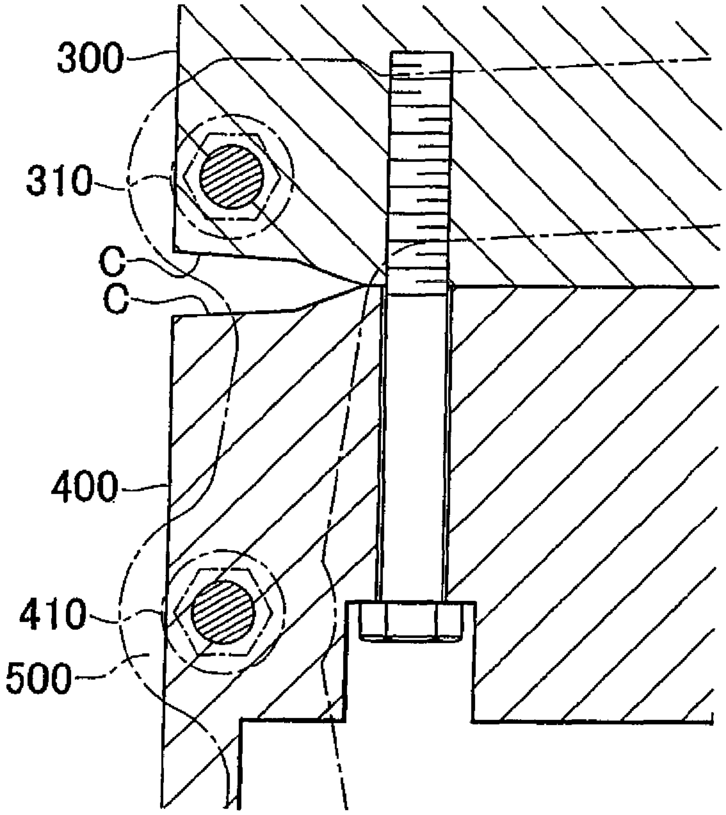
FIG. 5 PRIOR ART
FIG. 5 is an enlarged view showing cross-sections of a cylinder block and a crank case.

That is, as shown in the above-mentioned drawing of FIG. 5, in the case where the bracket 500 is provided at the end portions of the cylinder block 300 and the crank case 400, the opening amount of the mating faces C tends to be larger than in the case where the bracket 500 is provided close to the central portions of the cylinder block 300 and the crank case 400. This tendency is attributable to the following fact. When the bracket 500 is provided at those end portions, the bolts for fastening the cylinder block 300 and the crank case 400 to each other exist in the direction of the central portions of the cylinder block 300 and the crank case 400 as viewed from the first fastening portion 310 and the second fastening portion 410. However, no such bolt exists in the direction of the end portions of the cylinder block 300 and the crank case 400 as viewed from the first fastening portion 310 and the second fastening portion 410. Therefore, the fastening rigidity of the cylinder block 300 and the crank case 400 in the direction of the end portions of the cylinder block 300 and the crank case 400 as viewed from the respective fastening portions 310 and 410 is low. In this respect, according to this embodiment of the invention, even in the case where the bracket 50 is fixed in the vicinity of those end portions, the opening of the mating faces C of the cylinder block 20 and the crank case 30 can be suppressed.

As described above, according to this embodiment of the invention, the following operations and effects can be obtained. (1) The first fastening portion 100 for fastening the cylinder block 20 and the bracket 50 to each other and the second fastening portion 200 for fastening the crank case 30 and the bracket 50 to each other are so provided as to have interposed therebetween the fastening bolt 40 for fastening the cylinder block 20 and the crank case 30 to each other. Therefore, the opening of the mating faces C, which may be caused when the bracket 50 is securely fastened across both the cylinder block 20 and the crank case 30, which are adjacent to each other, can be suitably suppressed.

(2) The bracket 50 is provided at the end portions of the cylinder block 20 and the crank case 30. When the bracket 50 is provided at these end portions, the opening amount of the mating faces C of the cylinder block 20 and the crank case 30 tends to be large. In this respect, according to this embodiment of the invention, the first fastening portion 100 and the second fastening portion 200 are appropriately arranged according to the aforementioned mode. Therefore, even in the case where the bracket 50 is fixed in the vicinity of those end portions, the opening of the mating faces C can be suitably suppressed.

In the foregoing embodiment of the invention, the respective materials for the cylinder head 10, the cylinder block 20, the crank case 30, and the bracket 50 can be replaced with other materials.

In the foregoing embodiment of the invention, the case where the linear expansion coefficient of the material constituting the bracket 50 is smaller than the linear expansion coefficient of the material of the split bodies constituting the engine block 1 has been described.

It should be noted that the opening of the mating faces C as described above is a phenomenon that occurs when there is a difference in thermal expansion amount or thermal contraction amount between the split bodies constituting the engine block 1 and the bracket 50. Accordingly, the opening of the mating faces C may also be caused in the case where the linear expansion coefficient of the material constituting the bracket 50 is larger than the linear expansion coefficient of the material constituting the split bodies, namely, in the case where the thermal expansion amount of the bracket 50 is larger than the thermal expansion amount of the split bodies. In this case, the respective split bodies are pulled by the bracket 50 at high temperatures, and the mating faces C of the split bodies open as a result. In this respect, according to the foregoing embodiment of the invention, the first fastening portion 100 and the second fastening portion 200 are so provided as to have interposed therebetween the fastening bolt 40 for fastening the cylinder block 20 and the crank case 30 to each other, and those regions of the cylinder block 20 and the crank case 30 where this fastening bolt 40 is disposed are securely fixed. Accordingly, the opening of the mating faces C can be suitably suppressed even in the case where the linear expansion coefficient of the material forming the bracket 50 is larger than the linear expansion coefficient of the material forming the split bodies as described above.

Further, even in the case where the linear expansion coefficient of the split bodies constituting the engine block 1 and the linear expansion coefficient of the bracket 50 are equal to each other, there is created a difference in thermal expansion amount or thermal contraction amount between the split bodies and the bracket 50 when there is a difference in temperature between the split bodies and the bracket 50. Therefore, even in the case where the linear expansion coefficient of the split bodies and the linear expansion coefficient of the bracket 50 are equal to each other, the mating faces C of the split bodies may open in the same fashion as described above. In this respect, according to the foregoing embodiment of the invention, the opening of the mating faces C of the respective split bodies can be suitably suppressed even in the case where the thermal contraction amount of the bracket 50 is smaller than the thermal contraction amount of the split bodies or in the case where the thermal expansion amount of the bracket 50 is larger than the thermal expansion amount of the split bodies. Accordingly, in the foregoing embodiment of the invention, the opening of the mating faces C, which is caused as a result of a difference in temperature created between the split bodies and the bracket 50 when the linear expansion coefficient of the split bodies of the engine block 1 to which the bracket 50 is fastened and the linear expansion coefficient of the bracket 50 are equal to each other, can also be suitably suppressed.

Figure 3:
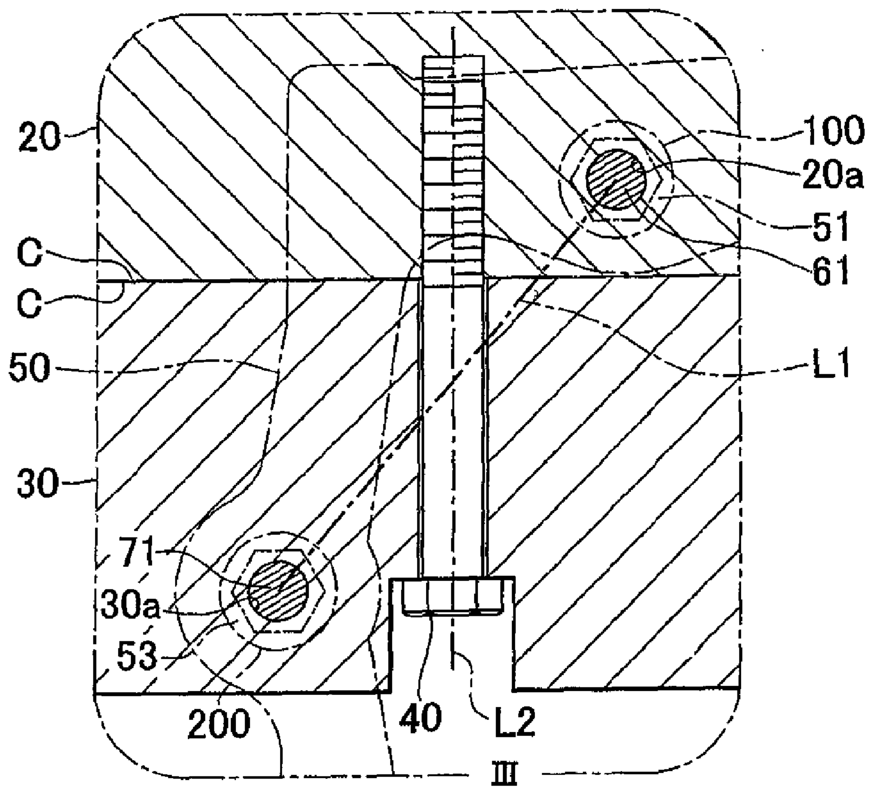
FIG. 3 is an enlarged cross-sectional view of a region III of FIG. 1, showing an engine block to which a bracket fastening structure according to a modification example of the embodiment of the invention is applied.

In the foregoing embodiment of the invention, the bracket 50 is provided in the vicinity of the end portions of the cylinder block 20 and the crank case 30. However, the bracket 50 may be provided, for example, close to the central portions of the cylinder block 20 and the crank case 30 (in the vicinity of a region III shown in the above-mentioned drawing of FIG. 1). In this case as well, similar operations and effects can be obtained by providing the first fastening portion 100 and the second fastening portion 200 such that the fastening bolt 40 for fastening the cylinder block 20 and the crank case 30 to each other is interposed between the first fastening portion 100 and the second fastening portion 200 as shown in FIG. 3 as an enlarged cross-sectional view of the region III.

Figure 4:
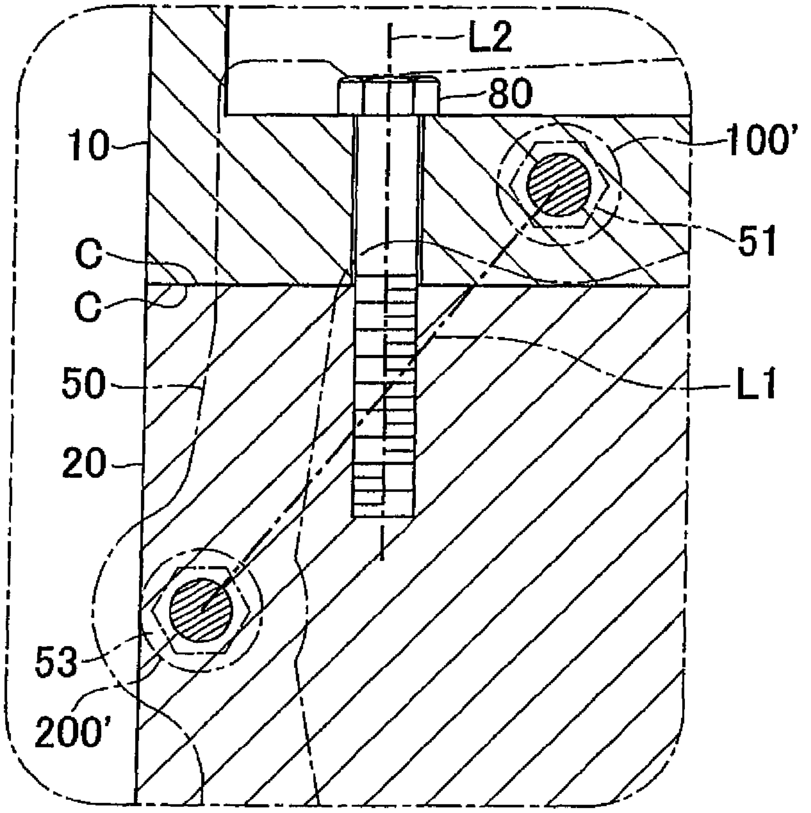
FIG. 4 is an enlarged view showing the cross-sectional structure of a cylinder head and a cylinder block of the engine block to which the bracket fastening structure according to the modification example of the embodiment of the invention is applied.

In the foregoing embodiment of the invention, the case where the cylinder block 20 and the crank case 30, which are the plurality of the split bodies constituting the engine block 1, are the first split body and the second split body respectively has been described. In addition, the bracket fastening structure according to the invention is similarly applicable also in the case where the cylinder head 10 is the second split body and the bracket 50 is securely fastened across both the cylinder block 20 and the cylinder head 10, which are adjacent to each other. In this case, as shown in FIG. 4, a first fastening portion 100' similar to the first fastening portion 100 and a second fastening portion 200' similar to the second fastening portion 200 may be so provided as to have interposed therebetween a fastening bolt 80 for fastening the cylinder head 10 and the cylinder block 20 to each other.

The aforementioned bracket 50 is a bracket for an auxiliary that is fixed to the engine block 1. However, the bracket 50 may be a bracket used for other purposes, for example, an engine mount bracket for fixing the internal combustion engine itself to the vehicle.

While the invention has been described with reference to the example embodiment thereof, it is to be understood that the invention is not limited to the described embodiment or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A bracket fastening structure with a bracket securely fastened across both adjacent ones of a plurality of split bodies constituting an engine block, namely, a first split body and a second split body, comprising:

a first fastening portion, including a first boss having a first thread portion formed therein, for fastening the first split body and the bracket to each other;

a second fastening portion including a second boss having a second thread portion formed therein, for fastening the second split body and the bracket to each other, wherein the first boss and the second boss are so provided as to have interposed therebetween a bolt for fastening the first split body and the second split body to each other, and wherein the portion of said bracket extending between said first boss and said second boss is asymmetrical with respect to a straight line extending between said first and said second bosses, and wherein the asymmetrical portion of the bracket is in an L-shape configuration.

2. The bracket fastening structure according to claim 1, wherein the bracket is provided at end portions of the first split body and the second split body.

3. The bracket fastening structure according to claim 1, wherein the bracket is provided at central portions of the first split body and the second split body.

4. The bracket fastening structure according to claim 1, wherein the first split body is a cylinder block, and the second split body is a crank case.

5. The bracket fastening structure according to claim 1, wherein the first split body is a cylinder block, and the second split body is a cylinder head.

6. The bracket fastening structure according to claim 1, wherein the bracket is a bracket for auxiliaries that is fixed to the engine block.

7. The bracket fastening structure according to claim 1, wherein the bracket is a bracket for fixing the engine block to a vehicle.

8. The bracket fastening structure according to claim 1, wherein the engine block and the bracket are made of materials that are different in thermal expansion amount or thermal contraction amount from each other.

9. The bracket fastening structure according to claim 1, wherein the engine block and the bracket are used under temperature environments that are different from each other.

10. The bracket fastening structure according to claim 1, wherein the engine block and the bracket are made of materials that are different in linear expansion coefficient from each other.

11. The bracket as claimed in claim 1, wherein a part of the bracket is in the form of a sub-component and the sub-component comprises only two bosses located on opposing sides of said bolt.

* * * * *